(12) United States Patent
Dawkins et al.

(10) Patent No.: US 11,588,742 B2
(45) Date of Patent: Feb. 21, 2023

(54) MULTIPATH TRAFFIC SWITCH DAMPING

(71) Applicant: TENCENT AMERICA LLC, Palo Alto, CA (US)

(72) Inventors: Paul Spencer Dawkins, Garland, TX (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 75 days.

(21) Appl. No.: 17/335,449

(22) Filed: Jun. 1, 2021

(65) Prior Publication Data

US 2022/0174018 A1   Jun. 2, 2022

Related U.S. Application Data

(60) Provisional application No. 63/120,383, filed on Dec. 2, 2020.

(51) Int. Cl.
| | |
|---|---|
| *H04L 12/841* | (2013.01) |
| *H04L 47/28* | (2022.01) |
| *H04L 45/24* | (2022.01) |
| *H04L 45/121* | (2022.01) |
| *H04L 12/727* | (2013.01) |

(52) U.S. Cl.
CPC ........... *H04L 47/28* (2013.01); *H04L 45/121* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 9,838,246 B1 * | 12/2017 | Hegde | H04L 45/18 |
| 2004/0042411 A1 * | 3/2004 | Dahlback | H04B 1/7113 |
| | | | 370/252 |
| 2009/0201803 A1 * | 8/2009 | Filsfils | H04L 12/1868 |
| | | | 370/222 |
| 2009/0307364 A1 | 12/2009 | Shimakura | |
| 2010/0098407 A1 | 4/2010 | Goswami et al. | |
| 2010/0195535 A1 * | 8/2010 | Ziller | H04L 45/123 |
| | | | 370/254 |

(Continued)

OTHER PUBLICATIONS

International Search Report dated Nov. 10, 2021, issued by the International Searching Authority in application No. PCT/US2021/044901.

(Continued)

*Primary Examiner* — Eunsook Choi
(74) *Attorney, Agent, or Firm* — Sughrue Mion, PLLC

(57) ABSTRACT

A method of managing multipath traffic switching in a network includes a plurality of shared paths, including selecting a first path from among the plurality of shared paths; setting an initial timer to an initial timer value; sending network traffic over the first path; based on determining that at least one path characteristic of the first path is unsatisfactory and that the initial timer has not expired, generating an updated timer value by increasing the initial timer value; and based on determining that the at least one path characteristic of the first path is unsatisfactory and that the initial timer has expired, selecting a second path, sending the network traffic over the second path, and setting an updated timer to the updated timer value.

20 Claims, 7 Drawing Sheets

(56) References Cited

U.S. PATENT DOCUMENTS

| | | |
|---|---|---|
| 2016/0036521 A1 | 2/2016 | Miyabe et al. |
| 2017/0207976 A1 | 7/2017 | Rovner et al. |
| 2019/0182146 A1 | 6/2019 | Skog et al. |
| 2020/0014616 A1 | 1/2020 | Michael et al. |
| 2021/0022067 A1* | 1/2021 | Tang .................... H04W 40/38 |

OTHER PUBLICATIONS

Written Opinion dated Nov. 10, 2021, issued by the International Searching Authority in application No. PCT/US2021/044901.
Paganini et al., "A Unified Approach to Congestion Control and Node-Based Multipath Routing", IEEE/ACM Transactions on Networking, vol. 17, No. 5, Oct. 2009, pp. 1413-1426.
Extended European Search Report dated Dec. 8, 2022, in European Application No. 21901195.4.
Communication dated Jan. 3, 2023, in European Application No. 21901195.4.

* cited by examiner

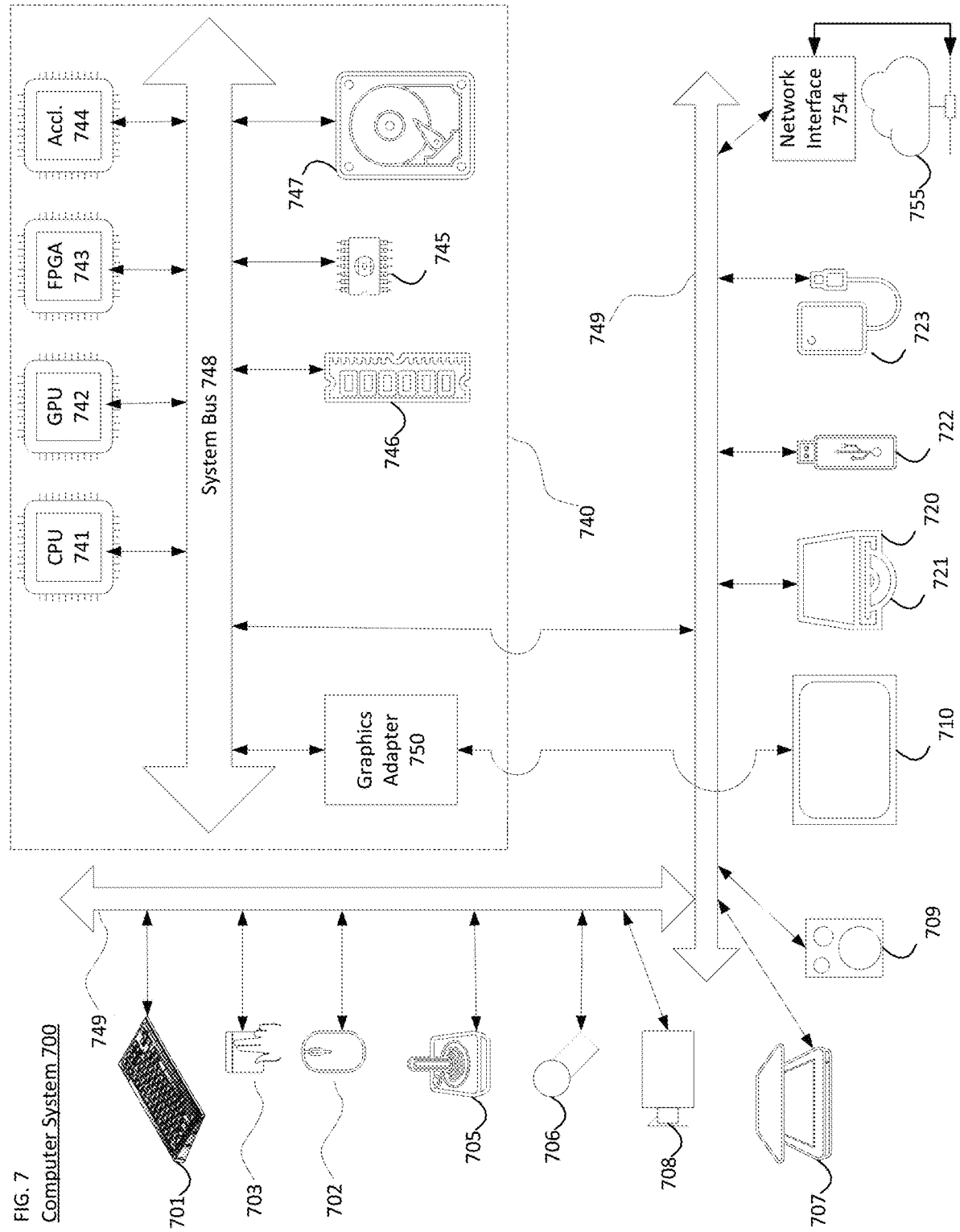

MULTIPATH TRAFFIC SWITCH DAMPING

CROSS-REFERENCE TO RELATED APPLICATION

This application claims priority under 35 U.S.C. § 119 to U.S. Provisional Application No. 63/120,383, filed on Dec. 2, 2020, in the United States Patent & Trademark Office, the disclosure of which is incorporated herein by reference in its entirety.

FIELD

The disclosed subject matter relates to the design and operation of networked computers with more than one available path between them, and, more specifically, minimizing the impact of switching traffic from one path to another on the network and on other computers, and other users.

BACKGROUND

In a network having multiple share paths, when a Sender "switches" the traffic it is sending from one path to another, if the new path is shared with other Senders and/or Receivers, the new traffic added to the shared path contends for path bandwidth and capacity. If the total path bandwidth and capacity is exceeded, traffic will be delayed, due to queuing delays, and may even be lost, if network buffers along the path are exhausted.

The Sender may respond to rising delays and traffic loss on this new path by "switching" from the overloaded path to another path, but this may result in persistent oscillation between paths, with negative impacts on traffic over shared paths and the computers and users involved with that traffic.

Accordingly, there is a need for a mechanism that, on one hand, switches between paths agile enough so to take advantage of multipath technologies, while on the other hand, "dampens" the amount of switching and resulting oscillation to avoid aforementioned negative impacts.

SUMMARY

In an embodiment, there is provided a method of managing multipath traffic switching in a network including a plurality of shared paths, including selecting a first path from among the plurality of shared paths; setting an initial timer to an initial timer value; sending network traffic over the first path; based on determining that at least one path characteristic of the first path is unsatisfactory and that the initial timer has not expired, generating an updated timer value by increasing the initial timer value; and based on determining that the at least one path characteristic of the first path is unsatisfactory and that the initial timer has expired, selecting a second path, sending the network traffic over the second path, and setting an updated timer to the updated timer value.

In an embodiment, there is provided a device for managing multipath traffic switching in a network including a plurality of shared paths, the including at least one memory configured to store program code; and at least one processor configured to read the program code and operate as instructed by the program code, the program code including: selecting code configured to cause the at least one processor to select a first path from among the plurality of shared paths; setting code configured to cause the at least one processor to set an initial timer to an initial timer value; sending code configured to cause the at least one processor to send network traffic over the first path; first generating code configured to cause the at least one processor to, based on determining that at least one path characteristic of the first path is unsatisfactory and that the initial timer has not expired, generate an updated timer value by increasing the initial timer value; and first redirecting code configured to cause the at least one processor to, based on determining that the at least one path characteristic of the first path is unsatisfactory and that that the initial timer has expired, select a second path, send the network traffic over the second path, and set an updated timer to the updated timer value.

In an embodiment, there is provided a non-transitory computer-readable medium storing instructions, the instructions including one or more instructions that, when executed by one or more processors of a device for managing multipath traffic switching in a network including a plurality of shared paths, cause the one or more processors to: select a first path from among the plurality of shared paths; set an initial timer to an initial timer value; send network traffic over the first path; based on determining that at least one path characteristic of the first path is unsatisfactory and that the initial timer has not expired, generate an updated timer value by increasing the initial timer value; and based on determining that the at least one path characteristic of the first path is unsatisfactory and that that the initial timer has expired, select a second path, send the network traffic over the second path, and set an updated timer to the updated timer value.

BRIEF DESCRIPTION OF THE DRAWINGS

Further features, the nature, and various advantages of the disclosed subject matter will be more apparent from the following detailed description and the accompanying drawings in which:

FIG. 7 is a schematic illustration of a computer system in accordance with an embodiment.

DETAILED DESCRIPTION

Figure 1:
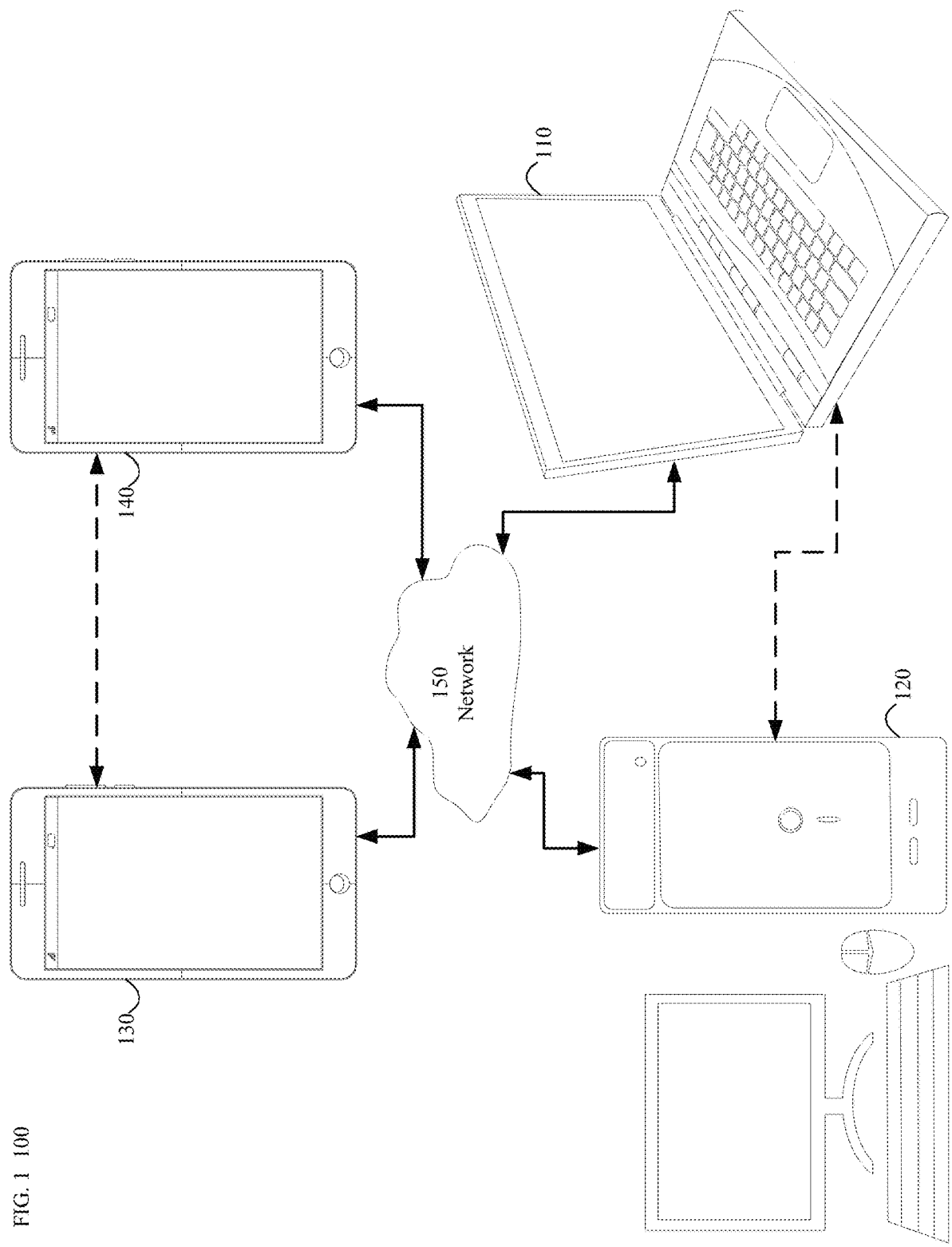
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code data at a local location for transmission to the other terminal (120) via the network (150). The second terminal (120) may receive the coded data of the other terminal from the network (150), and decode the data.

Unidirectional data transmission may be common in media serving applications and the like.

FIG. 1 illustrates a second pair of terminals (130, 140) provided to support bidirectional transmission of data. For bidirectional transmission of data, each terminal (130, 140) may code data for transmission to the other terminal via the network (150). Each terminal (130, 140) also may receive the coded data transmitted by the other terminal, may decode the coded data.

In FIG. 1, the terminals (110-140) may be illustrated as servers, personal computers and smart phones but the principles of the present disclosure may be not so limited. Embodiments of the present disclosure find application with laptop computers, tablet computers, media players, and the like. The network (150) represents any number of networks that convey data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
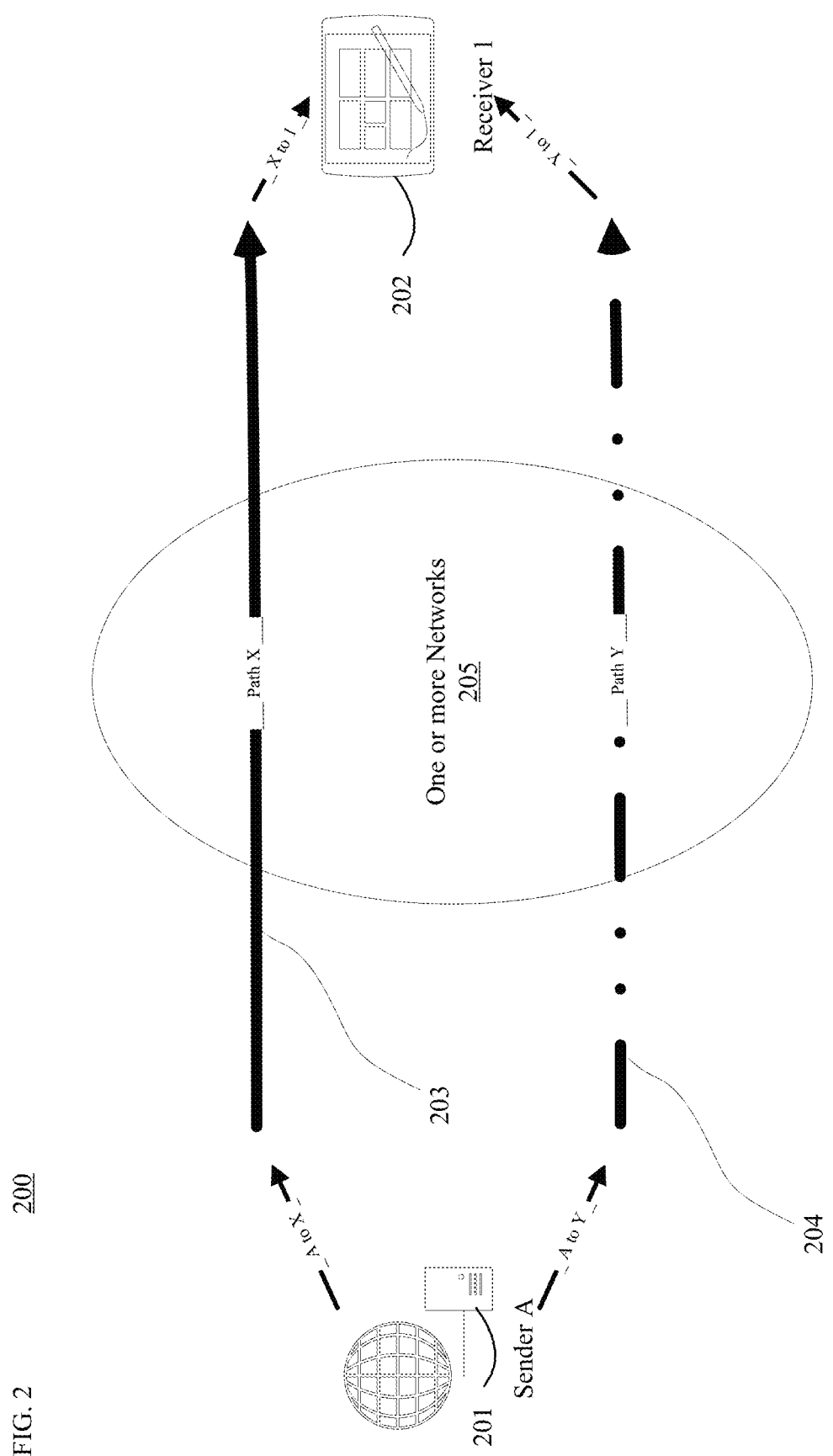
FIG. 2 is a schematic illustration of multipath capable networked computers using path X in accordance with an embodiment.

FIG. 2 illustrates an example of a multipath capable network (200), according to embodiments. Network 200 may include one or more Senders, for example Sender A (201), and one or more Receivers, for example Receiver 1 (202), connected by two or more Paths, for example Path X (203) and Path Y (204), which traverse one or more Networks (204). In FIG. 2 only one sender and one receiver are depicted.

Sender A (201) has the ability to send traffic on more than one Path, for example Path "A to X" (203) and Path "A to Y" (204), and the Receiver 202 has the ability to receive traffic from more than one Path, for example Path "X to 1" (203) and Path "Y to 1" (204).

In some environments, the characteristics of each available path, for example Path (203) and Path (204), may be indistinguishable, but in many environments, various paths can have significantly different path characteristics, including, available bandwidth and capacity, differences in measured round trip times or one-way delays, differences in error rates, priorities, and differences in cost for each path.

These differences may be configured at the Sender (201), measured by the Sender (201), measured by the Receiver (202) and echoed to the Sender (201), or measured by some third party with access to one or more of the Networks (205) connecting the Sender and Receiver.

The Sender may select a path based on one or more of a large number of considerations, including using paths as Active or Standby paths, trading off Path Latency for available Path Bandwidth, Bandwidth Aggregation across multiple paths, Load Balancing across multiple paths, Round Trip Times for each path, sending the same information on multiple paths to achieve redundancy for critical information, and Cost Minimization.

In FIG. 2, the Sender (201) is using "Path X" 203 for traffic, depicted as a solid line, while "Path Y" (204) is idle, depicted as a dashed-dotted line.

Figure 3:
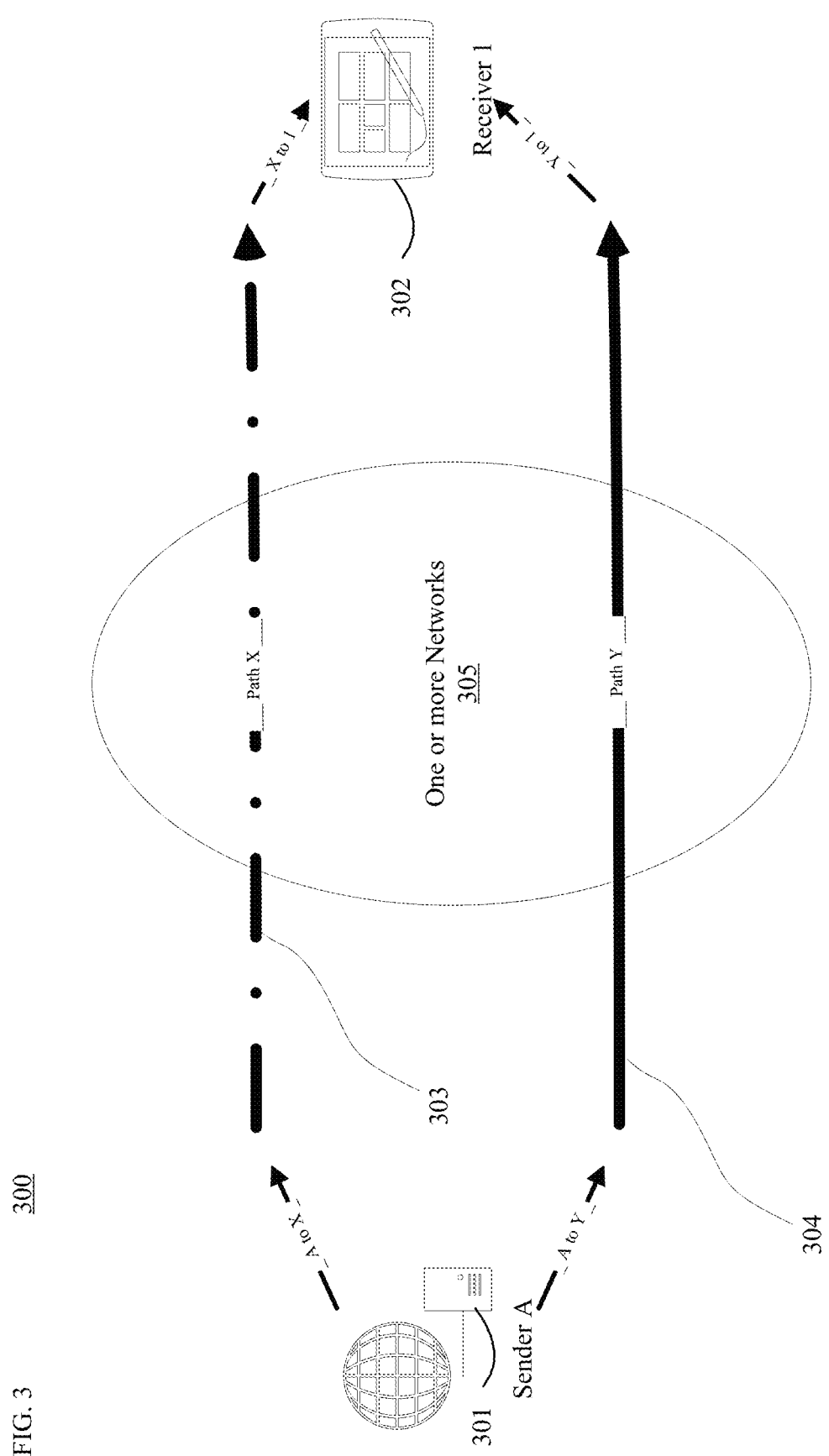
FIG. 3 is a schematic illustration of multipath capable networked computers after switching traffic to path Y in accordance with an embodiment.

FIG. 3 illustrates a multipath capable network (300), according to embodiments. In FIG. 3, the Sender (301) is switching traffic onto "Path Y" (304), depicted as a solid line, so that "Path X" (303) is now inactive, depicted as a dashed-dotted line.

Figure 4:
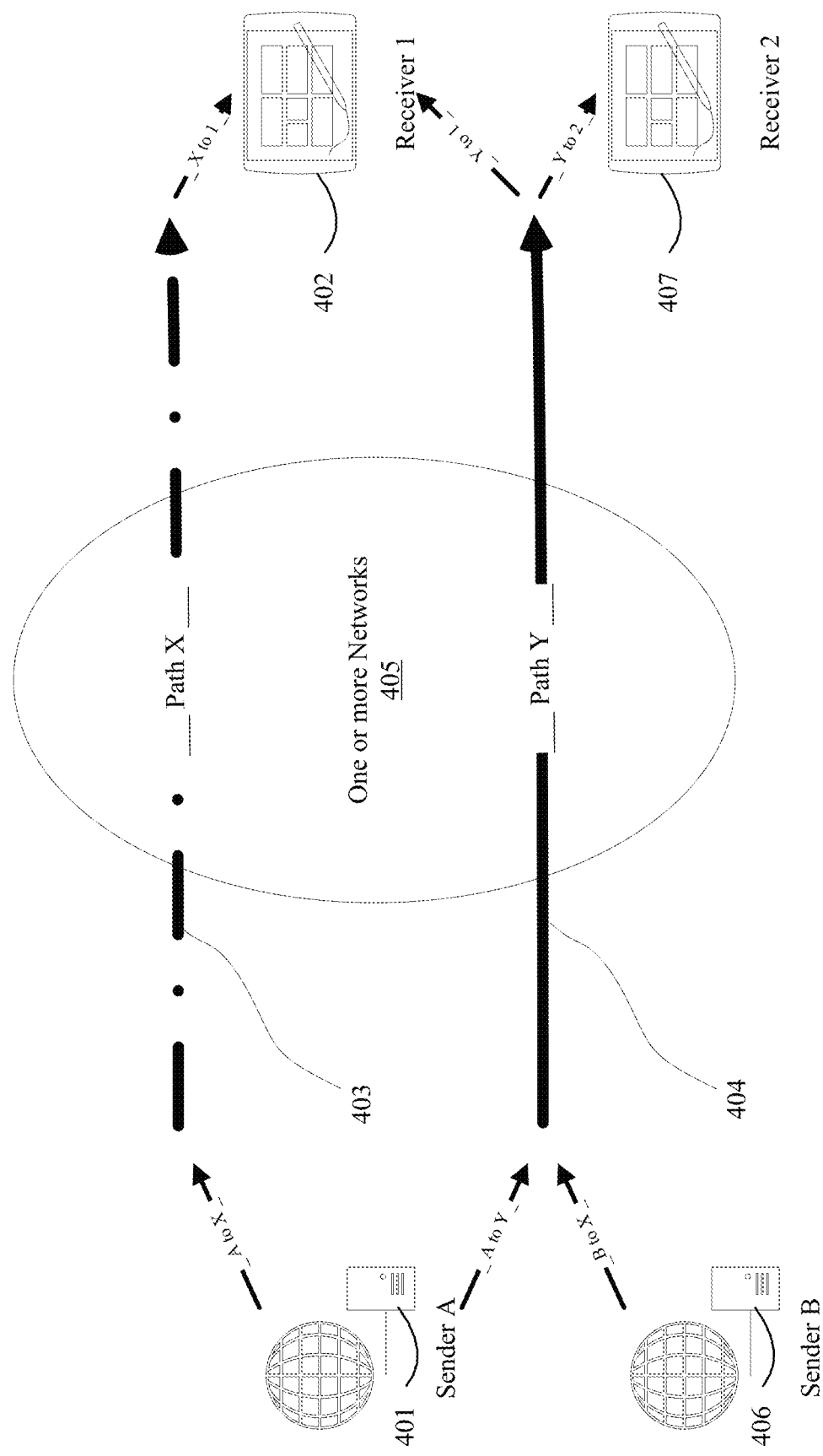
FIG. 4 is a schematic illustration of multipath capable networked computers switching traffic to shared path Y in accordance with an embodiment.

FIG. 4 illustrates a multipath capable network (400), according to embodiments. In FIG. 4, after the Sender (401) has switched traffic onto "Path Y" (404), this traffic is now being carried over a Path (404) that is also used by a second Sender, for example Sender B (406) for traffic destined for a second Receiver, for example Receiver 2 (407), through paths "B to Y" and "Y to 2". The Sender B (406) and Receiver 2 (407) may have other Paths available for traffic, but no other Paths are depicted in FIG. 3. The active Path (404) may be connecting additional Senders and Receivers, but no other Senders and Receivers are depicted in FIG. 4.

If the other Senders and Receivers do have other Paths available, the other Senders may also be making the same decisions about traffic switching to other Paths, and all Senders are making those decisions independently, without coordination.

What happens to the traffic sent by each of the Senders will depend on the characteristics of the Path they are now sharing, but if the impact of sharing overwhelms the Path bandwidth and capacity, each of the affected Senders may make additional decisions about switching its traffic to a different Path. This process of switching to a different Path may continue indefinitely, as long as the newly selected Path does not provide the desired path characteristics for the traffic being sent. With each switch to a different Shared Path, traffic from other Senders is disrupted, with potential for traffic loss, additional one-way delay and increased round trip times, and increased jitter for real-time traffic.

As discussed above, when a Sender "switches" the traffic it is sending from one path to another, if the new path is shared with other Senders and/or Receivers, the new traffic added to the shared path contends for path bandwidth and capacity. If the total path bandwidth and capacity is exceeded, traffic will be delayed, due to queuing delays, and may even be lost, if network buffers along the path are exhausted. The Sender may respond to rising delays and traffic loss on this new path by "switching" from the overloaded path to another path, but this may result in persistent oscillation between paths, with negative impacts on traffic over shared paths and the computers and users involved with that traffic.

Accordingly, embodiments may provide a mechanism which, on one hand, switches between paths agile enough so to take advantage of multipath technologies, while on the other hand, "dampens" the amount of switching and resulting oscillation to avoid aforementioned negative impacts.

Figure 5:
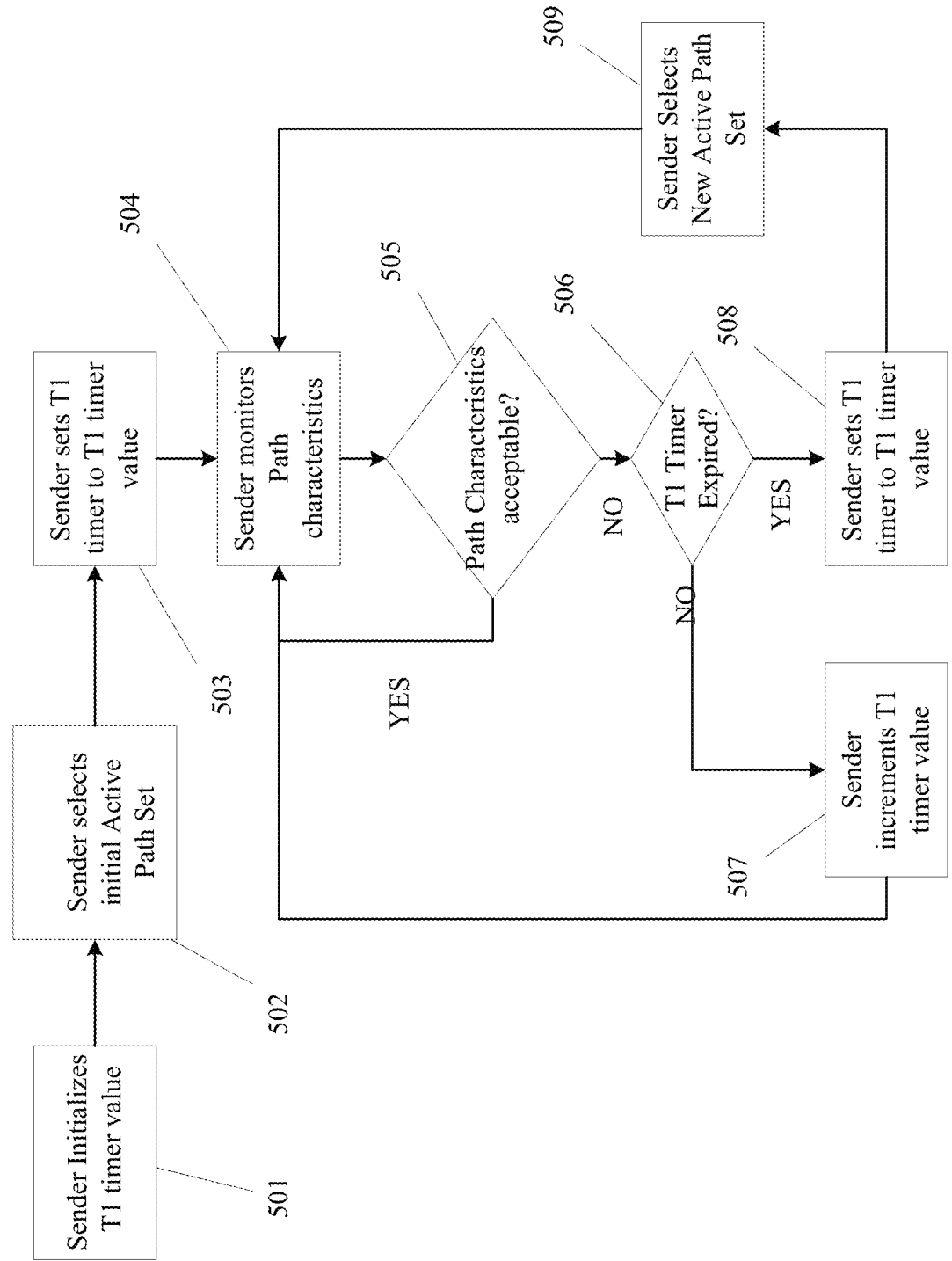
FIG. 5 is a flowchart of an example process showing a high-level procedure for a solution for multipath traffic switch damping in accordance with an embodiment.

FIG. 5 is a flowchart of an example process 500 showing a high-level procedure for a solution for multipath traffic switch damping in accordance with an embodiment. In FIG. 5, a Sender begins by initializing a T1 Timer value ("T1V") (block 501). The initial value of T1V may be provisioned or may be remembered from previous operation between the Sender and Receiver over this Path.

The Sender selects a Path which will be active (block 502)

The Sender sets the T1 timer to the initial T1V (block 503). The Sender monitors the active Path characteristics (block 504).

At appropriate time intervals, the Sender compares the measured Path characteristics to the desired Path characteristics (block 505). The desired Path characteristics may be any combination of a number of factors, that are appropriate for the traffic that will be sent on this Path. For example, the path characteristics and desired path characteristics may correspond to any characteristics discussed above with respect to FIGS. 2-4.

If the measured Path characteristics provide the desired Path characteristics, the Sender continues to monitor the active Path characteristics (block 504).

If the measured Path characteristics do not provide the desired Path characteristics, the Sender checks whether the T1 timer has expired (block 506).

If the T1 timer has not expired, the Sender increments the T1V (block 507) and continues to monitor the Path characteristics (block 504). The amount of T1V increase may be provisioned, may be determined experimentally, or may be adaptively selected. In an embodiment, doubling the T1V each time the Sender determines that the active Path does not provide the desired path characteristics may provide exponential "Damping" between repeated Path switches, minimizing the disruption of Path switching to this Sender/Receiver pair, and to any other Sender/Receiver pairs that share at least one Path with this Sender/Receiver pair. The maximum value of T1V may be provisioned or may be allowed to grow without bounds.

If the T1 timer has expired, the Sender rearms the T1 timer, setting it to the current T1V (block 508), selects a new active Path (block 509), and continues to monitor the active Path characteristics (block 504).

The example depicted in FIG. 5 does not decrease the T1V when the active path is "stable"—the Sender does not switch paths more often than the T1 timer expires. In embodiments, the T1V may be decreased in block 508 after setting the T1 timer to the current value of T1V. The amount of decrease may be provisioned, may be determined experimentally, or may be adaptively selected, but as long as the amount of decrease in block 508 is smaller than the amount of increase in block 507, the solution will still be stable, and will adapt to improvements in Path characteristics.

In some embodiments, the disclosed solution is used when any number of Paths is available between a Sender and Receiver. "Damping" is applied to the set of active Paths.

In some embodiments, the disclosed solution is used when additional Paths become available or become unavailable. "Damping" is applied to the set of active Paths.

In some embodiments, the disclosed solution is used when Path characteristics change markedly, for example, because of rerouting in one or more of the Networks being traversed, or because the Sender or Receiver "roams" from one network to another, as in modern cellular networks. Because the solution is adaptive, the T1 timer value will move toward an appropriate value for the active Paths, even when the set of Paths change.

Accordingly, embodiments may relate to a method for reducing the effect of Multipath Traffic Switching on traffic that traverses a plurality of shared paths including a first path. The method may include sending traffic over the first path; monitoring a first path characteristics of the first path; adjusting a timer value upwards by a predetermined amount in response to the first path characteristics not meeting predefined path characteristics; and switching from the first path to a second and different path when the timer expires and in response to the first path characteristics not meeting the predefined path characteristics.

Figure 6:
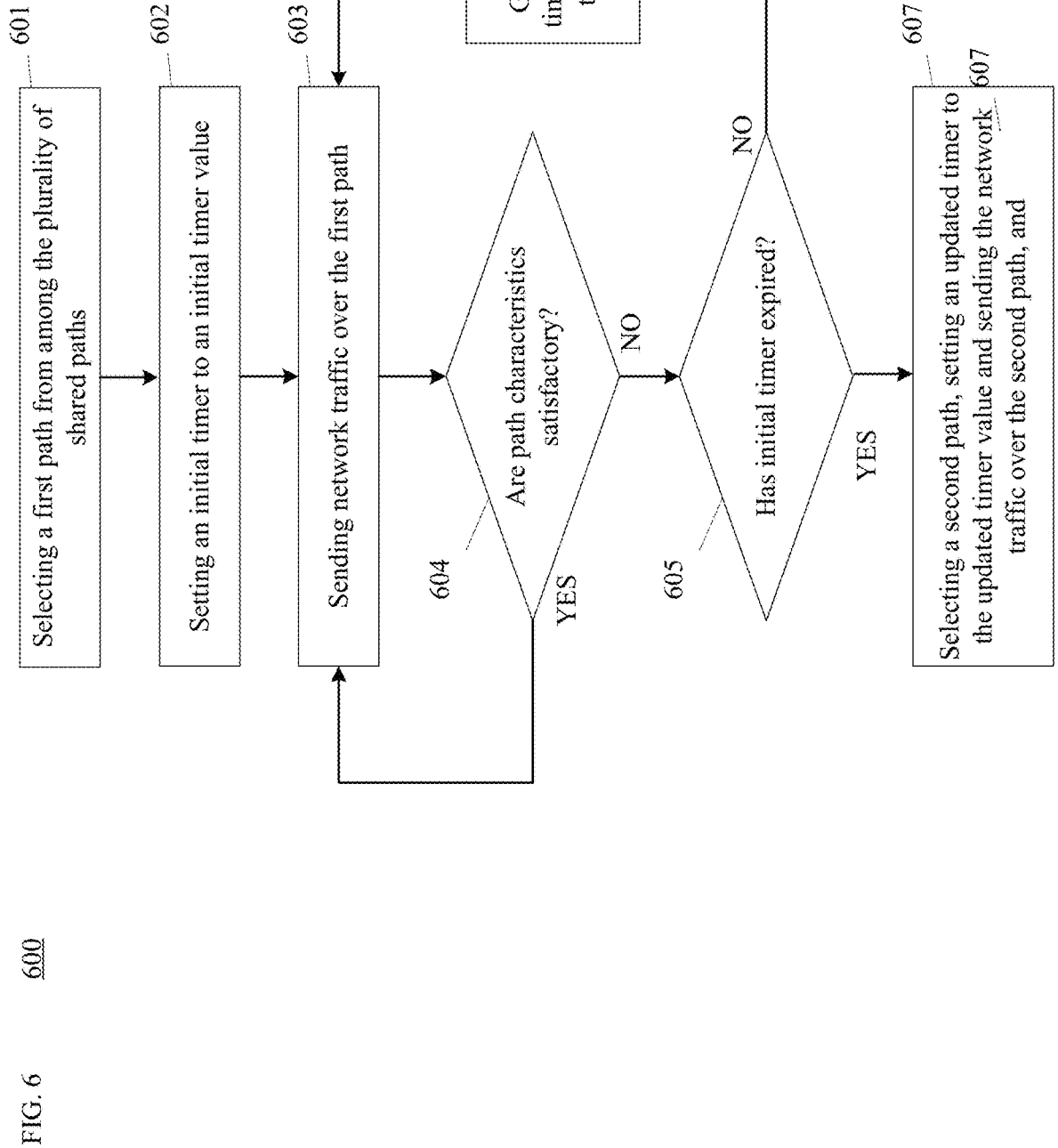
FIG. 6 is a flowchart of an example process for managing multipath traffic switching in a network including a plurality of shared paths in accordance with an embodiment.

FIG. 6 is a flowchart is an example process 600 for managing multipath traffic switching in a network including a plurality of shared paths. In some implementations, one or more process blocks of FIG. 6 may be any of the devices and elements discussed above.

As shown in FIG. 6, process 600 may include selecting a first path from among the plurality of shared paths (block 601).

As further shown in FIG. 6, process 600 may include setting an initial timer to an initial timer value (block 602). In embodiments, this initial timer value may correspond to T1V discussed above.

As further shown in FIG. 6, process 600 may include sending network traffic over the first path (block 603).

As further shown in FIG. 6, process 600 may include determining whether path characteristics of the first path are satisfactory (block 604). The path characteristics may be any combination of a number of factors, that are appropriate for the traffic that will be sent on this path. For example, the path characteristics may correspond to any characteristics discussed above with respect to FIGS. 2-5, and may be considered satisfactory or unsatisfactory for any reason associated with the path characteristic.

As further shown in FIG. 6, based on determining that path characteristics of the first path are satisfactory (YES at block 604), process 600 may return to block 603.

As further shown in FIG. 6, based on determining that at least one path characteristic of the first path is not satisfactory (NO at block 604), process 600 may proceed to block 605.

As further shown in FIG. 6, process 600 may include determining whether the initial timer has expired (block 605).

As further shown in FIG. 6, based on determining that the initial timer has not expired (NO at block 605), process 600 may include generating an updated timer value by increasing the initial timer value (block 606) and then return to block 603.

As further shown in FIG. 6, based on determining that the initial timer has expired (YES at block 605), process 600 may include selecting a second path, sending the network traffic over the second path, and setting an updated timer to the updated timer value (block 605).

In embodiments, the updated timer value may be generated by increasing the initial timer value by a predetermined amount.

In embodiments, the updated timer value may be generated by increasing the initial timer value by an amount that is adaptively determined based on the at least one path characteristic of the first path.

In embodiments, the updated timer value may be generated to be less than or equal to a predetermined maximum timer value.

In embodiments, the updated timer value may include a first updated timer value and the updated timer may include a first updated timer, and the method may further include generating a second updated timer value by decreasing the first updated timer value after the updated timer is set; and based on determining that at least one path characteristic of the second path is unsatisfactory and that the first updated timer has expired, selecting a third path, sending the network traffic over the third path, and setting a second updated timer to the second updated timer value.

In embodiments, the initial timer may be set to the initial timer value based on determining that the plurality of shared paths are available.

In embodiments, the initial timer may be set to the initial timer value based on determining that additional paths are added to the plurality of shared paths.

In embodiments, the initial timer may be set to the initial timer value based on detecting a change in the at least one path characteristic of the first path.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710 and associated graphics adapter 750, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove, or joystick 705, but there can also be tactile feedback devices that do not serve as input devices), audio output devices (such as: speakers 709, headphones (not depicted)), visual output devices (such as screens 710 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface(s) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (1154) that attached to certain general purpose data ports or peripheral buses (1149) (such as, for example universal serial bus (USB) ports of the computer system 700; others are commonly integrated into the core of the computer system 700 by attachment to a system bus as described below (for example Ethernet interface into a PC computer system or cellular network interface into a smartphone computer system). As an example, network 755 may be connected to peripheral bus 749 using network interface 754. Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (1154) as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators 744 for certain tasks, and so forth. These devices, along with Read-only memory (ROM) 745, Random-access memory (RAM) 746, internal mass storage such as internal non-user accessible hard drives, solid-state drives (SSDs), and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include peripheral component interconnect (PCI), USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of managing multipath traffic switching in a network including a plurality of shared paths, the method comprising:
    selecting a first path from among the plurality of shared paths;
    setting an initial timer to an initial timer value;
    sending network traffic over the first path;
    based on determining that at least one path characteristic of the first path is unsatisfactory and that the initial timer has not expired, generating an updated timer value by increasing the initial timer value; and
    based on determining that the at least one path characteristic of the first path is unsatisfactory and that the initial timer has expired, selecting a second path, setting an updated timer to the updated timer value, and sending the network traffic over the second path.

2. The method of claim 1, wherein the updated timer value is generated by increasing the initial timer value by a predetermined amount.

3. The method of claim 1, wherein the updated timer value is generated by increasing the initial timer value by an amount that is adaptively determined based on the at least one path characteristic of the first path.

4. The method of claim 1, wherein the updated timer value is generated to be less than or equal to a predetermined maximum timer value.

5. The method of claim 1, wherein the updated timer value comprises a first updated timer value and the updated timer comprises a first updated timer, and
    wherein the method further comprises:
        generating a second updated timer value by decreasing the first updated timer value after the updated timer is set; and
        based on determining that at least one path characteristic of the second path is unsatisfactory and that the first updated timer has expired, selecting a third path, setting a second updated timer to the second updated timer value, and sending the network traffic over the third path.

6. The method of claim 1, wherein the initial timer is set to the initial timer value based on determining that the plurality of shared paths are available.

7. The method of claim 1, wherein the initial timer is set to the initial timer value based on determining that additional paths are added to the plurality of shared paths.

8. The method of claim 1, wherein the initial timer is set to the initial timer value based on detecting a change in the at least one path characteristic of the first path.

9. A device for managing multipath traffic switching in a network including a plurality of shared paths, the device comprising:
    at least one memory configured to store program code; and
    at least one processor configured to read the program code and operate as instructed by the program code, the program code including:
        selecting code configured to cause the at least one processor to select a first path from among the plurality of shared paths;
        setting code configured to cause the at least one processor to set an initial timer to an initial timer value;
        sending code configured to cause the at least one processor to send network traffic over the first path;
        first generating code configured to cause the at least one processor to, based on determining that at least one path characteristic of the first path is unsatisfactory and that the initial timer has not expired, generate an updated timer value by increasing the initial timer value; and
        first redirecting code configured to cause the at least one processor to, based on determining that the at least one path characteristic of the first path is unsatisfactory and that the initial timer has expired, select a second path, set an updated timer to the updated timer value, and send the network traffic over the second path.

10. The device of claim 9, wherein the updated timer value is generated by increasing the initial timer value by a predetermined amount.

11. The device of claim 9, wherein the updated timer value is generated by increasing the initial timer value by an amount that is adaptively determined based on the at least one path characteristic of the first path.

12. The device of claim 9, wherein the updated timer value is generated to be less than or equal to a predetermined maximum timer value.

13. The device of claim 9, wherein the updated timer value comprises a first updated timer value and the updated timer comprises a first updated timer, and
wherein the program code further includes:
second generating code configured to cause the at least one processor to generate a second updated timer value by decreasing the first updated timer value after the updated timer is set; and
second redirecting code configured to cause the at least one processor to, based on determining that at least one path characteristic of the second path is unsatisfactory and determining that the first updated timer has expired, select a third path, set a second updated timer to the second updated timer value, send the network traffic over the third path.

14. The device of claim 9, wherein the initial timer is set to the initial timer value based on determining that the plurality of shared paths are available.

15. The device of claim 9, wherein the initial timer is set to the initial timer value based on determining that additional paths are added to the plurality of shared paths.

16. The device of claim 9, wherein the initial timer is set to the initial timer value based on detecting a change in the at least one path characteristic of the first path.

17. A non-transitory computer-readable medium storing instructions, the instructions comprising: one or more instructions that, when executed by one or more processors of a device for managing multipath traffic switching in a network including a plurality of shared paths, cause the one or more processors to:
select a first path from among the plurality of shared paths;
set an initial timer to an initial timer value;
send network traffic over the first path;
based on determining that at least one path characteristic of the first path is unsatisfactory and that the initial timer has not expired, generate an updated timer value by increasing the initial timer value; and
based on determining that the at least one path characteristic of the first path is unsatisfactory and that that the initial timer has expired, select a second path, set an updated timer to the updated timer value, and send the network traffic over the second path.

18. The non-transitory computer-readable medium of claim 17, wherein the updated timer value is generated by increasing the initial timer value by at least one of a predetermined amount, or an amount that is adaptively determined based on the at least one path characteristic of the first path.

19. The non-transitory computer-readable medium of claim 17, wherein the updated timer value comprises a first updated timer value and the updated timer comprises a first updated timer, and
wherein the program code further causes the one or more processors to:
generate a second updated timer value by decreasing the first updated timer value after the updated timer is set; and
based on determining that at least one path characteristic of the second path is unsatisfactory and determining that the first updated timer has expired, select a third path, set a second updated timer to the second updated timer value, and send the network traffic over the third path.

20. The non-transitory computer-readable medium of claim 17, wherein the initial timer is set to the initial timer value based on at least one from among determining that the plurality of shared paths are available, determining that additional paths are added to the plurality of shared paths, or detecting a change in the at least one path characteristic of the first path.

* * * * *